April 13, 1954  S. O. SCHLAF  2,675,536
CONTROL DEVICE FOR SELECTING SYSTEMS
Filed July 30, 1952  6 Sheets-Sheet 1

INVENTOR
STANLEY O. SCHLAF
BY
ATTORNEY

April 13, 1954     S. O. SCHLAF     2,675,536
CONTROL DEVICE FOR SELECTING SYSTEMS
Filed July 30, 1952     6 Sheets-Sheet 3

FIG. 4
STATION 2

INVENTOR
STANLEY O. SCHLAF
BY
ATTORNEY

April 13, 1954     S. O. SCHLAF     2,675,536
CONTROL DEVICE FOR SELECTING SYSTEMS
Filed July 30, 1952     6 Sheets-Sheet 5

FIG. 6

INVENTOR
STANLEY O. SCHLAF
BY John A. Hall
ATTORNEY

April 13, 1954  S. O. SCHLAF  2,675,536
CONTROL DEVICE FOR SELECTING SYSTEMS
Filed July 30, 1952  6 Sheets-Sheet 6

INVENTOR
STANLEY O. SCHLAF
BY
ATTORNEY

Patented Apr. 13, 1954

2,675,536

UNITED STATES PATENT OFFICE 2,675,536

CONTROL DEVICE FOR SELECTING SYSTEMS

Stanley Orville Schlaf, West Chicago, Ill., assignor to Pioneer Electric and Research Corporation, Forest Park, Ill., a corporation of Illinois Application July 30, 1952, Serial No. 301,711

3 Claims. (Cl. 340—147)

This invention relates to signaling systems and particularly to selecting means for remote control of electrically operated apparatus.

The object of the invention is to provide an economical, rugged, reliable and simple remote control selecting means which may be employed for a variety of purposes and bring the advantages of certain conventional but highly developed and costly selector systems into more general use.

Reference is hereby made to application, Serial Number 301,666, filed July 30, 1952, in the name of Davidsmeyer et al., and application Serial Number 301,748, filed July 30, 1952, in the name of Bernard Cahill, for the disclosure of various, separate and distinct inventions made in the development of a selecting system embodied in identical disclosures in the present application and the said other two applications.

The invention, in essence, resides in the use of start stop distributors, common in the printing telegraph art, activated by synchronous motors similar to those employed in the ubiquitous clock which depends on the present day precise regulation of the frequency of the commercial electric power supply in substantially all communities. Through the use of such motors a selecting system need not be confined to any one location where the same power supply is available to drive all the start stop distributor motors but may embrace an extensive area including a number of different power sources and be operated over a line long enough to be classed as a toll or long distance line. The selecting system may be used for telecommunication purposes, as for selectively enabling any one or more of, or combination of, stations each provided with telecommunication apparatus so that these selected stations may be enabled. The selecting system may be used for releasing any previously enabled station or combination of stations and for setting up a new combination. In such a use a master station and a plurality of outlying stations may be joined in a conventional ring circuit over which the selection may be made and the telegraph message may thereafter be transmitted.

It will be understood, however, that the present invention is not exclusively used for telecommunication purposes but may be employed for a wide variety of purposes where a selection and operation of one or more of a plurality of stations for any purpose is desired. The invention may be used for such simple purposes as the selective operation of call signals such as lamps, buzzers or bells or for the more complicated purposes of remote control of machinery.

A feature of the invention is the use of small synchronous motors for driving the start stop distributors, operated from local commercial alternating current mains, the said commercial supplies at different locations having one common characteristic, namely a precisely regulated frequency, substantially of the same value at all locations. It will be found in practice that often the alternating current supply used for the various stations is one and the same, in other cases that a common source of precisely regulated frequency is employed by different electricity supply companies for a reference standard and in still other cases that commercial demands lead to great accuracy in the maintenance of the frequency characteristics of the supply so that the commercial supply at all points where stations for a system of the present invention may be installed are completely adequate to cause the various distributors of the system to operate synchronously. In accordance with this feature, it is to be particularly pointed out that, highly accurate regulation of the frequency while desirable is not necessary, for the tolerances in the operation of the distributors are wide and since any single operation is of only a few seconds' duration, synchronism in the operation of a plurality of these motors is sufficiently accurate even if the regulation of the frequency of the sources is entirely inadequate for the purpose of driving the household clocks. Substantially uniform frequency for operating the motors of the system is sufficient.

A feature of the invention is a time measuring means started and maintained in operation by a manually operable means for enabling the signaling means, which may therefore be effectively started only if the said manually operable means is held operated over a minimum predetermined period of time. Since the system of the present invention is constructed and arranged to operate over a circuit employed for other conventional signaling means, this time delay is introduced as a means for differentiating from the same type but generally shorter duration signals employed by such conventional means. By way of example, the system of the present invention may be operated over a conventional printing telegraph ring circuit having a plurality of printing telegraph stations serially connected and must be rendered unresponsive to the printing telegraph signals.

In accordance with this feature each synchronous start stop distributor station is provided with a constantly operating synchronous motor, the sources of alternating current at the various stations not being necessarily the same nor in phase with each other but substantially of the same frequency so that the various motors will operate at substantially the same speed. Advantage is taken of the fact that practically all localities now have a standard 60 cycle commercial supply, which may be used for timing purposes in the operation of the present invention and thus eliminate other intricate and costly timing apparatus.

Another feature of the invention is a means constituting a slow operating relay. This consists essentially of a pair of contacts to be closed after a predetermined period of time and which are driven by a constant speed motor. A coil for clutching these contacts to the constantly operating motor is provided so that upon energization thereof the contacts are started in operation and through the movement of the motor are caused to come into contact to close any given circuit after the lapse of a given period, by way of example, three hundred milliseconds. By the use of such a relay the unlatching of the distributor may be delayed for a period of time greater than any conventional signal which may be transmitted over the common circuit.

Another feature of the invention is a relay having a coil and a constantly rotating core, an armature suspended above said core adapted upon the energization of said coil to be brought into frictional engagement with said core for rotation and carrying a contact piece brought by the rotation of said armature into cooperative relationship with a stationary contact, said armature being suspended on a spring which on deenergization of said coil will return said armature and its contact piece to their normal positions.

Another feature of the invention is a noncumulative slow operating relay, in other words one which will require a definite and predetermined period of time in which to effect an electrical contact but which cannot succeed in closing such a contact on a repeated succession of energizations each of less than the said predetermined period. This relay is constructed and arranged to release to its normal position at high speed so that in effect it responds to a train of impulses by starting its contact closing movement on each impulse from its starting position and will not build up to an operated position on anything less than an impulse equal to or greater than the said predetermined duration.

Still another feature of the invention is a relay in which the contacts move slowly and at a uniform rate to an operated position upon the energization of the coil thereof but which release and move back to their normal position at a high rate of speed.

Another feature of the present invention is the use of a plurality of start stop distributors in a series circuit so that the circuit is, during the simultaneous operation of the said plurality of distributors, periodically closed again into a single series circuit as all the distributors simultaneously pass over corresponding segments. With the exception of the master station, from which the selection is controlled, some sort of circuit is completed through each station for every segment of its distributor. In general a relay coil of a function relay is included in the circuit of a different one of the function segments at each station and the remainder of the function segments lead in common through the coil of a relay incidentally used for signaling the information that some other station has been selected and enabled. Where such signalled information is not needed this common coil must nevertheless be used but will perform no other function than to provide a closed path through the station so that the function relay at some other station may be operated. In accordance with this feature the ring circuit includes a single conductor in series relationship with a plurality of start stop distributor means whereby during the simultaneous rotation of said distributors a plurality of derived circuits are sequentially established. Since a function relay may be included in each derived circuit, one at each of said different stations, any one or more of said stations may be selected by effectively closing the corresponding derived circuit or circuits at a master station.

In accordance with this feature accuracy in operation may be gained at the expense of time and thus provide a selecting system somewhat slower in operation than other highly developed conventional systems but nevertheless of rugged and dependable operation so that an economical device is provided for a field requiring a selecting device but which could not economically justify conventional apparatus. By the use of comparatively slow operating synchronous motors powered by the widespread and precisely regulated commercial electric supply sources, a plurality of start stop distributors may be dependably placed in series and may dependably sequentially close a plurality of circuits so that if one of such circuits is marked for operation it may be used effectively for a selecting operation. It must nevertheless be understood that the principle of the invention is applicable to high speed systems as well as to the comparatively slow speed system herein disclosed by way of example. It will be understood that the economy of the system, however, has a degree of control over the speed employed, and while the principle of a plurality of start stop distributors in series may be perfectly feasible for a high speed system, the cost of the more precise control necessary for such speedy operation probably could not be justified for the field of use of the present means.

Another feature of the invention is an arrangement for automatically restoring all stations to normal as a first step in a selecting operation. The system of the present invention is known as a push button selector system and is characterized by the use of a conventional type of push button arrangement whereby the setting of a given button corresponding to a wanted station or combination of stations automatically and mechanically releases any other button theretofore operated. In addition each station is provided with a releasing or cut off relay for restoring the station circuit to normal and all these releasing relays are included in the first derived circuit so that when the distributors have been started on a round the first operation is a releasing operation thus restoring all stations to normal and putting them in proper condition for the immediately following selecting operation, that is the operation of the function relay at the selected station or stations and the operation of a guard relay at all other stations.

A feature of the invention may therefore be stated as a selector system control means which performs a double function on each selecting operation, (1) that of releasing any one or more of the selectors previously enabled and (2) that of enabling any one or more selectors for a present operation. When the operator at a master station makes a selection he does so by actuating any given one or more of the push buttons provided and then operates his start key. As the distributors rotate, one of the first derived circuits closed is a clear out or release circuit which acts to release any selector previously locked in circuit.

Another feature of the invention is what has been termed an error circuit, that is a safety means for preventing erroneous operation of the devices of the present invention. The circuit in question consists essentially of a means by which an operation started by a manual operation is completed automatically and without interference by any succeeding manipulation of the means used for the original manual operation. This circuit may be considered as a control means, triggered into operation manually but, after being so triggered, beyond any further manual control.

In accordance with this feature, and particularly where the time measuring means is employed to prevent the starting of the start stop distributors until a period of time greater than that necessary for certain conventional signals has elapsed, a start key is provided. This may be manipulated by an operator but must be maintained in operation until the distributors have been started. If released prior to that instant the apparatus will be returned to normal without further effect. However, if held in operation for a longer period, the error circuit will be triggered and the control will be removed from under any further influence of the start key.

In one respect the start key will have continued control, for by its manipulation it provides a locking circuit for the error circuit and therefore serves as a means to lock in the triggered error circuit whereby the continued or prolonged operation of the start key actually serves as a protection against any ill effects of such a prolonged operation. Essentially, therefore, the so-called error circuit provides means to insure a complete and proper operation of the selecting means and prevent any mutilation of the signals therein. A feature of the invention may therefore be stated as the combination of a start key, a means for starting a device in operation under control of said key, and a means responsive to a movement of said device for locking said starting means under joint control of said key and said device.

In accordance with this feature means are provided to insure the automatic and complete restoration of the distributors at all stations as a preliminary to a selecting operation. It will be noted that a selecting operation is started by an opening, by the start key, of the series circuit extending through all the stations whereby all the line relays are simultaneously released and which therefore all simultaneously close the local circuits for operating the latch magnets. Each distributor starts its operation and each therefore operates its off normal contacts which results in the operation of a trigger relay which in turn opens the circuit of the latch magnet. This trigger relay then locks to the back contacts of the line relay so that it is now under the joint control of the off normal contacts and the line relay and therefore cannot release and effectively establish a circuit for the latch magnet. As each distributor reaches its home position it is stopped by its latch and by virtue of having reached its home position operates its off normal contacts to a position to release the trigger relay. This relay, however, remains operated so long as the line relay remains released as when the operator is slow in releasing the start key. Again the series circuit cannot be completely closed and therefore no line relay can be energized again until each and every one of the distributors has reached its home position. Hence the error circuit provides a means for insuring synchronization of the system.

Another feature of the invention is a means to stop definitely each distributor on the completion of each rotation and hold it latched awaiting a succeeding manual start operation. In accordance with this feature the distributors cannot be operated continuously by the mere continued operation of the start key but must perforce end their operation at the end of one complete rotation and remain latched until the start circuit is released or reconditioned by a release of the start key prior to another operation thereof.

Another feature of the invention is a means for automatically releasing the latch of a distributor immediately that it has been operated to allow the distributor to start its movement so that the latch will be returned to its normal position and in readiness to stop the distributor at the end of a complete rotation thereof. The above described error circuit provides a locking means for the present means, whereby further operation of the distributor latch is inhibited until all parts of the device, including the start key, have been returned to normal.

Still another feature of the invention is a clutch of novel design. It is conventional in a start stop distributor device to have a constantly rotating motor associated through a clutch with a distributor. The clutch is so devised that it will slip as long as the latch holds the distributor but will grip and turn the distributor arm at full speed as soon as the latch is disengaged. The clutch of the present invention is simple, rugged and dependable and has no parts bearing on one another frictionally. It consists essentially of a smooth surfaced disc terminating a driven shaft, a smooth surfaced cup terminating a driving shaft and a mass of viscous fluid, such as a silicone within the said cup and in which the said disc is immersed. This fluid will allow slippage of one element with respect to the other with little drag on the motor while the distributor remains latched but will provide a firm bond between driving and driven elements at other times and will move the distributor arm at practically full speed immediately that the latch is released.

In accordance with this feature, the fluid clutch of the present invention, includes the use in one embodiment thereof of a chemical compound known as dimethylpolysiloxane, an organic compound composed of long chains of carbon, hydrogen, oxygen and silicon atoms linked repetitively in a diagram typical of complex organic compounds. This has a viscosity of 30,000 centistokes, a viscosity temperature coefficient of .61, a freezing point of −44° C., and a boiling point of 200° C. The invention however is not limited to this particular compound but includes other fluids of similar physical properties.

Nor is it to be understood that the invention is limited to a clutch of the particular size or function of the present clutch but is of broad scope, including clutches for other uses but constructed as taught herein. The particular fluid herein employed exhibits true Newtonian flow characteristics but the invention also comprehends other fluids which exhibit non-Newtonian flow characteristics as where, by way of example, it is desired to produce a low initial torque with a rising characteristic or conversely where a large temperature-viscosity coefficient is desired to produce a comparatively large starting torque for a short time under cold conditions. It is limited only in that the fluid employed should be capable of wetting the smooth surfaces of the driving and driven elements so as to produce a bond therebetween.

Other uses of the novel viscous clutch of the present invention, by way of example, may include its use to provide overload protection for motor, a means of picking up heavy or slow starting loads, a constant torque differential take up for tape recorders or moving picture projectors, or as a slow speed torque limiter it could function as a safety device to deliver a predetermined fixed maximum force.

Other features will appear hereinafter.

The drawings consist of six sheets having nine figures, as follows.

In each of Figs. 2, 3, 4 and 5 a source of sixty cycle alternating current is shown. These various sources may be one and the same or they may be entirely independent sources depending on the location of the various stations. Each is shown as a source of 117 volt alternating current, thus indicating a commercial supply. It is not necessary that these voltages be exactly alike since by the use of suitable transformers the supply for the different stations of the system may be regulated in well known manner. It is necessary, however, that the frequency characteristics of these various sources be substantially or reasonably the same. It will be noted in Fig. 2 that the source of supply 1 is connected through a fuse 2 and a switch 3 to a pair of conductors leading through the jack and plug device to the winding of a synchronous motor 4 so that this synchronous motor will be constantly rotating. Also this source of supply is connected by a transformer 5 through a rectifier 6 and a network consisting of an impedance element 7 and a condenser 8 to form a suitable supply of direct current for the operation of the relays and other apparatus of the system. In each of Figs. 2 to 5 inclusive there is shown a jack and plug arrangement having thirty-two cooperating elements. This is a convenience since it renders it possible and easy to take the device shown in Figs. 6, 7 and 8 out of circuit for repair, adjustment or replacement. It will be understood that this jack and plug device is not necessary to the proper functioning of the apparatus but is, as above stated, employed as a convenience.

Figures 1, 2:
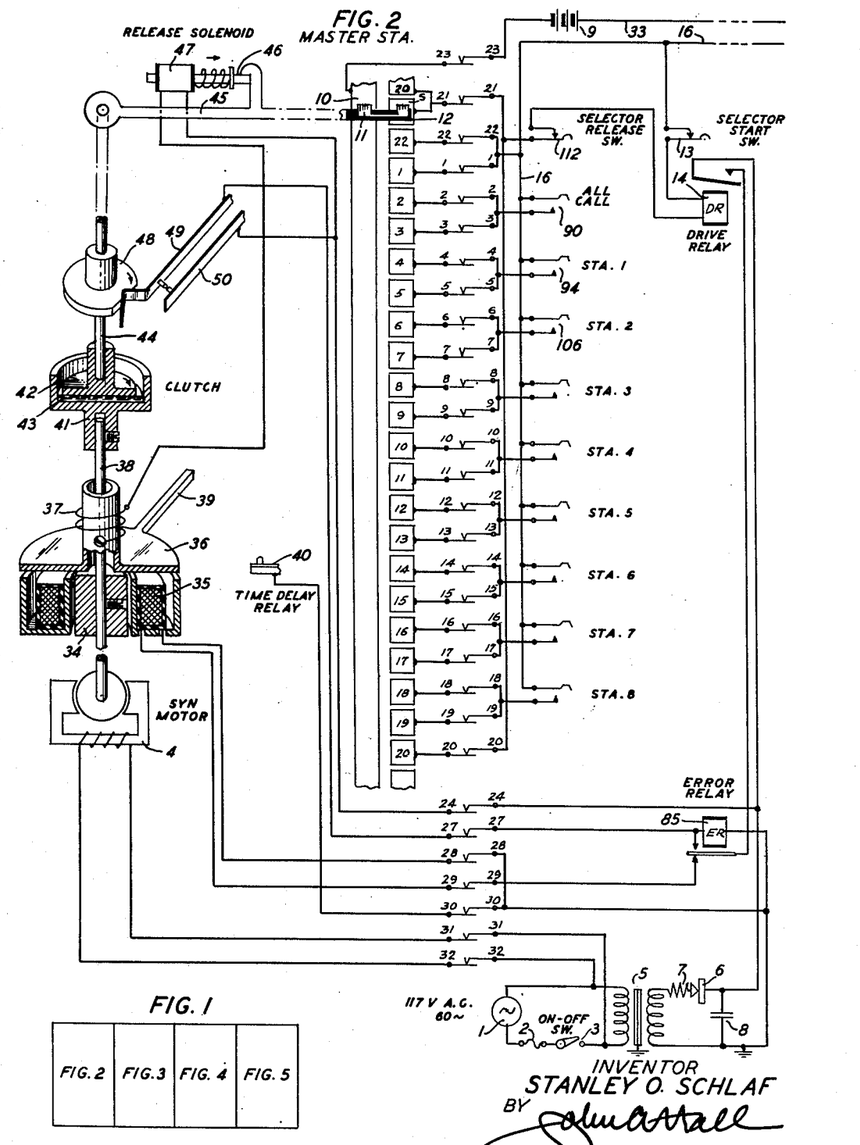
Fig. 1 is a block diagram showing how Figs. 2, 3, 4 and 5 may be placed to form a complete schematic circuit diagram of a system according to the present invention.
Fig. 2 shows a schematic circuit diagram with the apparatus used at a transmitting station shown schematically and partly in section.
Figure 3:
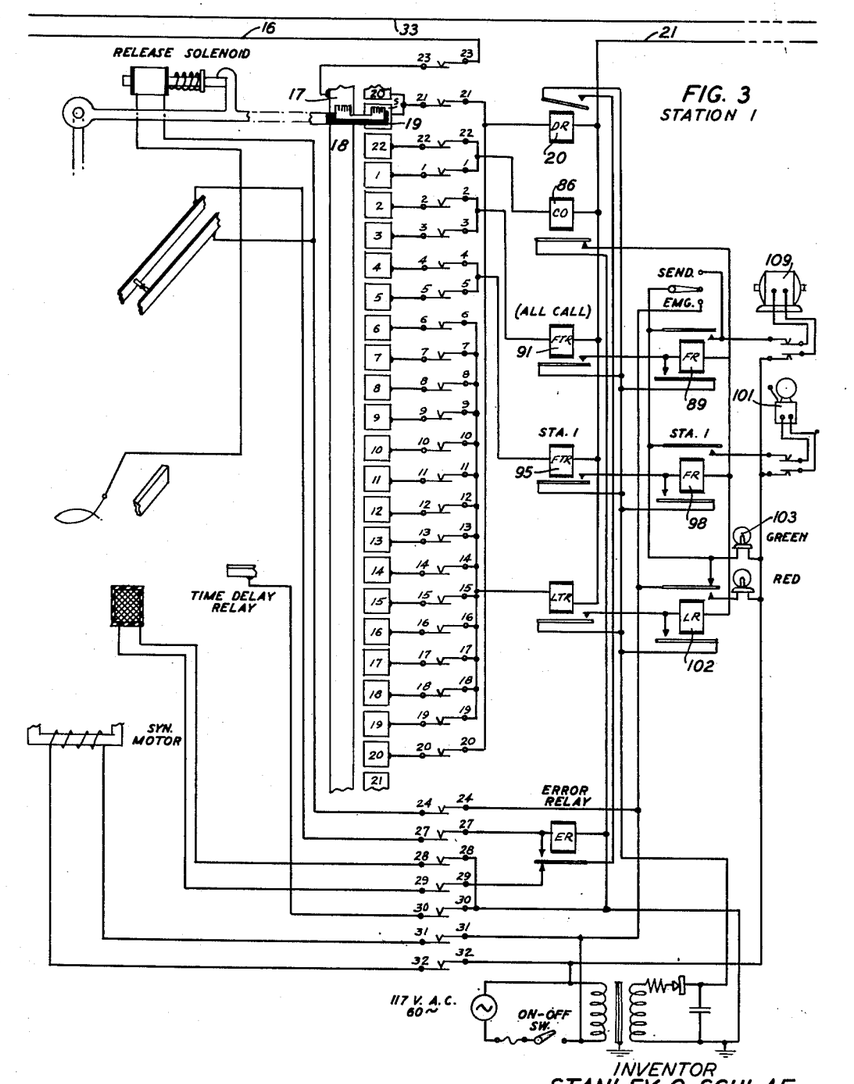
Fig. 3 shows a similar schematic circuit diagram for one of the plurality of receiving stations and having the apparatus thereat shown in skeleton form with the parts thereof placed in the same relative positions as shown in Fig. 2.
Figure 4:
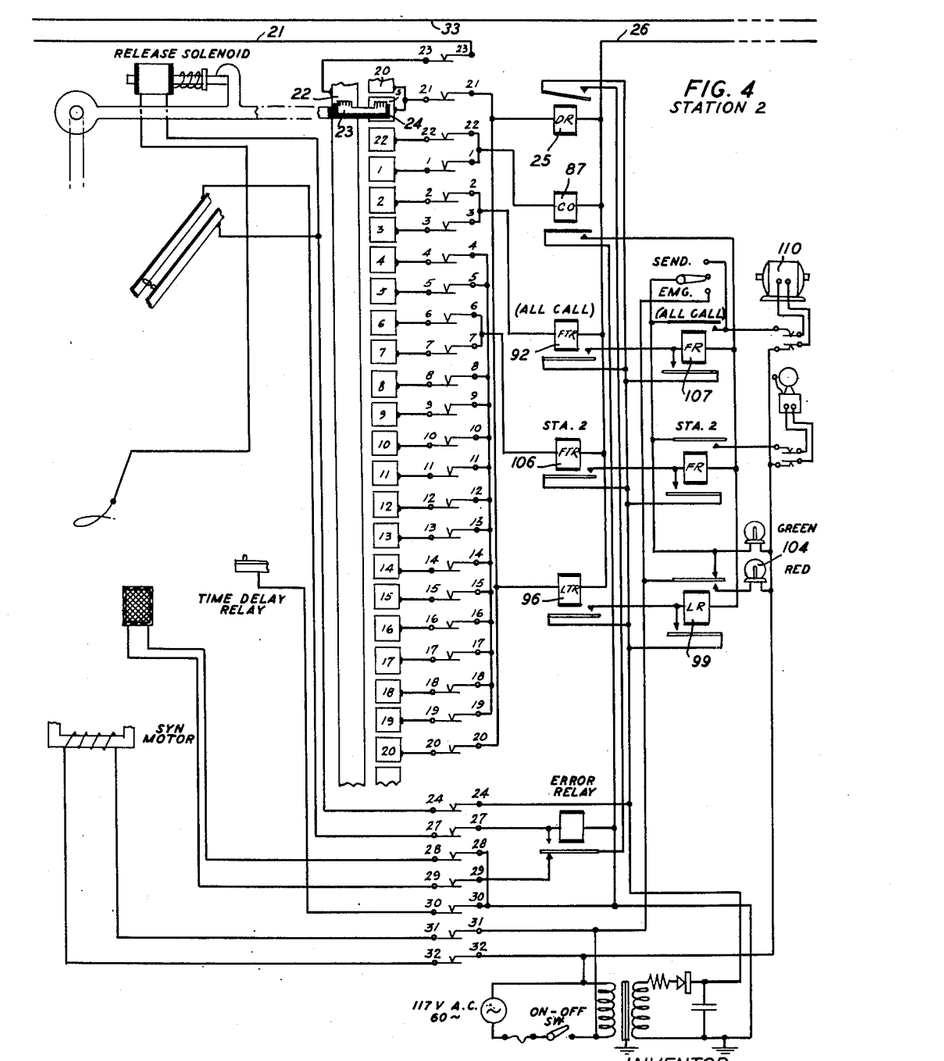
Fig. 4 is a similar schematic circuit diagram.
Figure 5:
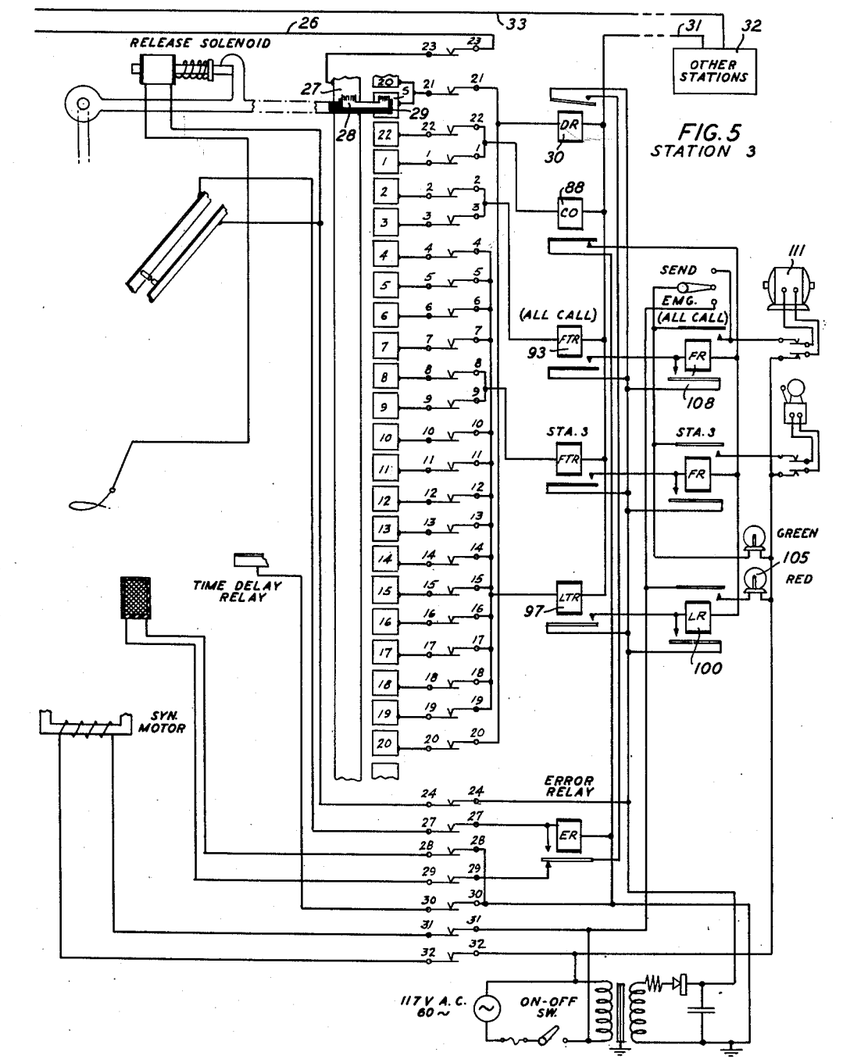
Fig. 5 is a similar circuit diagram showing also a block indication of other stations which may be included in the circuit.

At the top of Fig. 2 a battery 9 (which may also be derived from the commercial source) is shown, which supplies current in a loop circuit which may be traced in detail through the jack and plug (23), the ring of the distributor 10, the brush 11 thereof in its normal arrested position, the stop segment 12, the plug and jack (21), the start switch 13, the drive relay 14, conductor 16, jack and plug (23) of the station number 1 shown in Fig. 3, ring 17 of the distributor thereat, brush 18, start segment 19, plug and jack (21), drive relay 20, conductor 21, jack and plug (23) of station number 2 shown in Fig. 4, ring 22 of the distributor thereat, brush 23, start segment 24, plug and jack (21), drive relay 25, conductor 26, jack and plug (23) of station number 3 shown in Fig. 5, ring 27 of the distributor thereat, brush 28, start segment 29, plug and jack (21), drive relay 30, conductor 31, thence through other stations 32 and finally back over conductor 33 to the battery 9. Since this circuit is closed, all of the drive relays included therein, such as the DR relay 14, the DR relay 20, the DR relay 25 and the DR relay 30 will be energized and therefore will maintain an open contact at their armatures.

All of the synchronous motors at the various stations will be operating and since the frequency characteristics of all the various sources of alternating current are substantially the same these motors will be operating at the same speed. Looking at Fig. 2 it will be seen that the shaft of the motor has secured to it a magnetic piece 34 which constitutes a core for a relay whose coil 35 is cooperatively associated therewith. An armature for this relay consists of a magnetic disc 36 which is supported by a coiled spring 37 in such a manner that it floats a short distance above the core 34 but is not attached to the shaft 38 of the motor. When the coil 35 is energized the armature 36 is attracted to the core 34 and, making frictional engagement therewith, begins a rotary movement in the direction of rotation of the motor indicated herein as clockwise. Attached to the armature 36 there is a contact piece 39 which will approach and finally make contact with another contact piece 40.

At its upper extremity a cup shaped piece 41 is attached to the shaft 38 of the motor 4 and rotates constantly therewith. A disc 42 having no mechanical connection with this cup is shown as being placed therein and in accordance with this invention is immersed in a fluid 43. The shaft 44 terminates in a latch 45 which is normally held stationary by the element 46 of a solenoid 47. Therefore the cup 41 constantly rotates but the disc 42 remains stationary.

The physical characteristics of the fluid 43 are such that the cup 41 may constantly rotate while the disc 42 remains stationary without an undue drag on the motor. This constitutes a fluid clutch and when the element 46 is withdrawn from the latch 45 the disc 42 will immediately begin to rotate with the cup 41 with practically no slippage between the two.

The fluid used in this clutch may vary over a wide range. One of the most suitable is one of those chemical compounds known as a silicone, the particular one being dimethylpolysiloxane, an organic compound composed of long chains of carbon, hydrogen, oxygen and silicon atoms linked repetitively in a diagram typical of complex organic compounds. This has a viscosity temperature of 30,000 centistokes, a viscosity coefficient of .61, a freezing point of —44° C. and a boiling point of 200° C. It is of particular value in its present application because it maintains its viscosity values over a wide range of temperatures for long periods of time, exhibits true Newtonian flow characteristics, is relatively inert to materials used in the present device, has good lubricating qualities when used in the present manner and is readily available commercially not only with the constants above stated but in a wide range of viscosities.

The invention, however, is not limited to the use of this one fluid but includes the use of other fluids of similar physical characteristics, such as certain petroleum oils having suitable temperature-viscosity coefficients.

There is a cam 48 attached to the shaft 44 so that as soon as the shaft 44 leaves its normal position a connection will be made between the off normal springs 49 and 50.

Figure 6:
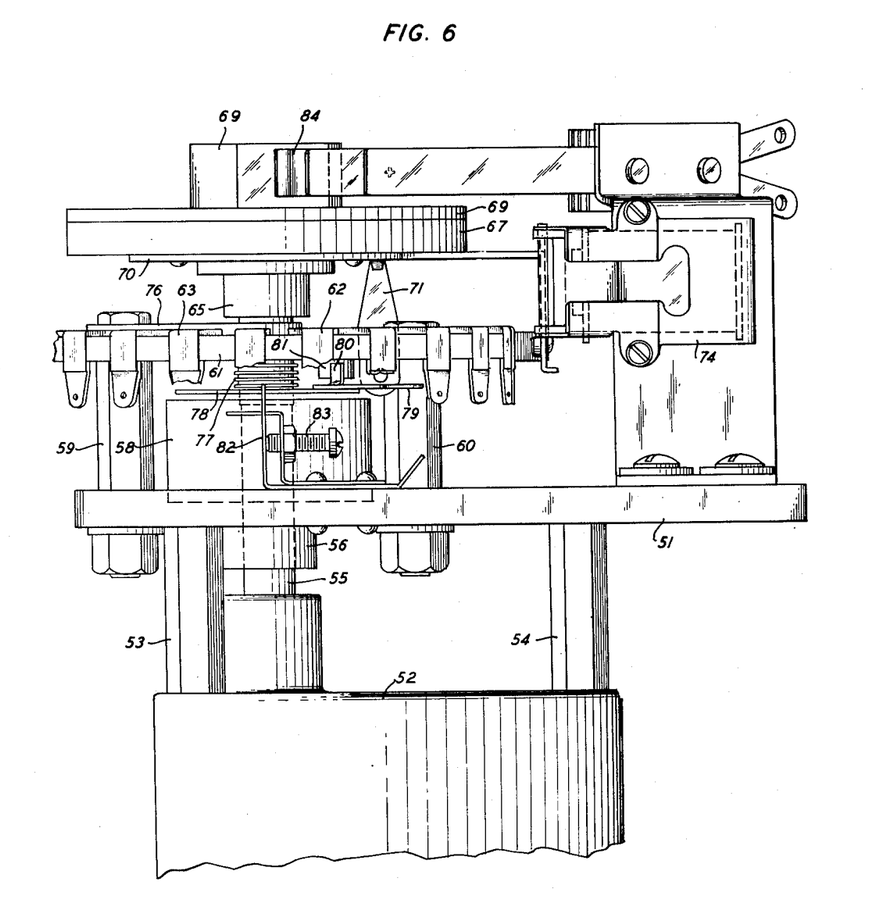
Fig. 6 is a side view, much enlarged, of the apparatus including the distributor and the means by which it is operated.
Figure 7:
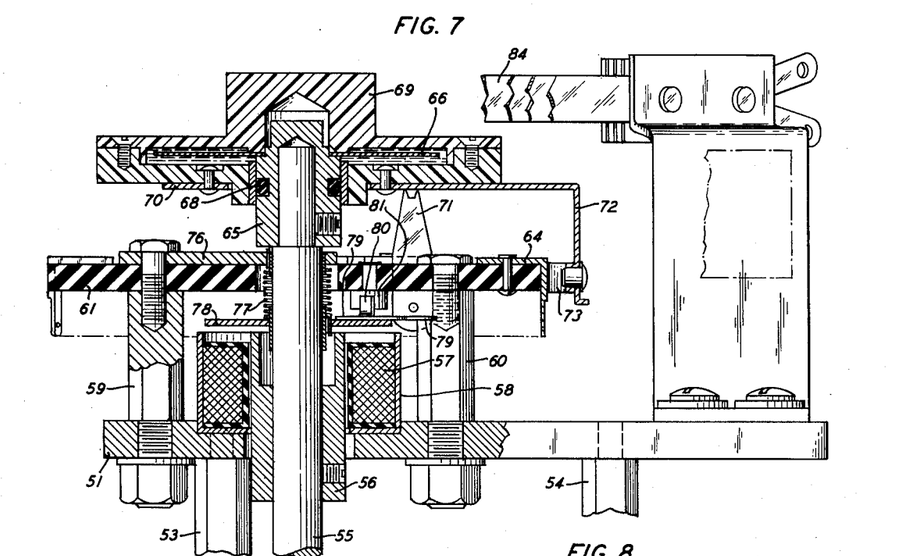
Fig. 7 is a vertical section of part of the apparatus shown in Fig. 6.
Figure 8:
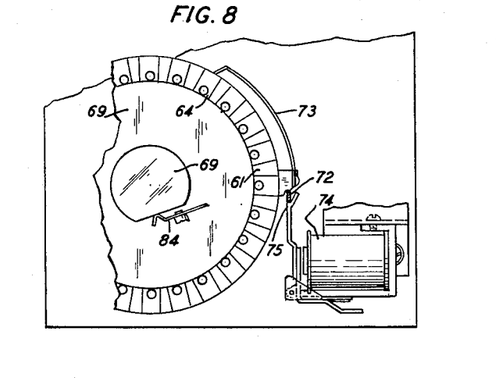
Fig. 8 is a top view showing details of the latch and the manner in which the distributor arm may be released and allowed to operate.

These arrangements may be seen in Figs. 6, 7 and 8 substantially in the form in which the device is manufactured. Here it will be seen that a base plate 51 forms an element to which the other parts are secured. The motor 52 is shown secured to the base plate 51 by means of the stand off posts 53 and 54. The shaft 55 of the motor is seen as extending upwardly, particularly in Fig. 7. The magnetic piece 56 secured to the shaft 55 forms a constantly rotating core for a relay whose coil 57 is encased in a magnetic shell 58. By means of a pair of stand off posts 59 and 60 a circular insulating element 61 is supported. Around the periphery of this circular piece there are a plurality of contact pieces, such as the contact pieces 62 and 63 pictured in Fig. 6. The contact piece 64 indicated in Fig. 8 is the stop segment of the distributor.

Attached to the shaft 55 at its upper end there is an element 65 to which is attached a disc 66. A circular cup like element 67 of insulating material is placed over the element 65 and by means of an O-ring or elastic torus 68 the connection between the elements 65 and 67 is made fluid tight. A third or cap element 69 also of insulating material is secured to the cup element 67 so as to form a reservoir therebetween in which a disc 66 may rotate. The element 69 has a narrow ring portion or bearing surface on the plate 66 to maintain a proper distance between the upper surface of the element 69 and the plate 66. The space within the reservoir is filled with a viscous fluid having physical characteristics which will allow the disc 66 to rotate constantly without placing an undue drag on the motor and yet which will impart the motion of the motor and the disc 66 to the reservoir device formed of the elements 67 and 69 when the latch is released.

There is a ring of metal 70 secured to the underside of the element 67 on which a brush 71 constantly bears so that an electrical connection may be made between the brush 71 and the ring 70 in all positions thereof. At one point the ring 70 is extended and bent downwardly as at 72 and to this a brush 73 is secured which will bear on the faces of the various segments shown. In Fig. 8 the clutch magnet 74 is shown carrying at the end of its armature a shear 75 which engages the portion 72 of the distributor brush and holds it against rotation. It will be noted that when the magnet 74 is energized the shear 75 will be moved to the right and out of engagement with the brush portion 72 so that at this time the fluid clutch will become active and cause the brush 73 to make a complete revolution, making contact in turn with each of the segments of the distributor.

Attached to the insulating circular piece 61 there is a member 76 to which a spiral spring 77 is secured. The spring 77 is attached at its other end to a magnetic armature 78. The spring 77 is so formed that it will hold the magnetic part 78 in the position shown in Figs. 6 and 7, that is, floating a short distance away from the constantly rotating core 56. There is attached to the armature 78 a contact piece 79 having a bent up tab 80 resting against a stop 81. When the coil 57 is energized the magnetic piece 78 will be attracted downwardly so that it comes into frictional engagement with the constantly rotating core 56 and rotates therewith until the contact piece 79 comes into engagement with the stationary contact piece 82. By means of an adjusting screw 83 the normal distance between the contact piece 79 at rest and the contact piece 82 may be adjusted so that in practice all of the various time delay or slow operating relays will make the connection between the pieces 79 and 82 simultaneously.

The top portion of the cap piece 69 is generally circular in shape but having a segment cut off as shown in Fig. 8 so that the off normal spring 84 may be operated shortly after the beginning of the movement of the brush 73.

Going back now to the circuit diagram shown in Figs. 2 to 5 inclusive the operation of the device may be described as follows. Disregarding the actual selecting operations for the present it may be noted that when the fundamental circuit is fed by the battery 9 is opened by means of the switch 13 that the DR relay 14 is deenergized. Thereupon a circuit will be established from battery leading from the rectifier 6 through the armature and back contact of the DR relay 14, the armature and back contact of the ER relay 35, the solenoid of the time delay relay 35 to ground. The armature 36 will thus be attracted to the constantly rotating core 34 and the contact piece 39 will move toward the contact piece 40. When contact between these pieces is made a circuit is established from battery through the winding of the release solenoid 41, the spiral spring 37, the contact piece 39, the contact piece 40 to ground, whereupon the latch 45 is released and the brush 11 under the influence of the fluid drive clutch begins to move over its segments.

The system shown in Figs. 2 to 5 inclusive and employing the time delay relay is useful in a system where the loop circuit is also employed for the transmission of other signals such as printing telegraph signals. The time delay relay would respond to such signals but would restore after each so that even a train of such signals would fail to start the distributor. In this system the start switch must be held open for a period of time long enough to cause the time delay switch or slow operating relay to close effectively its contacts.

If the start switch 13 has been maintained open and therefore the DR relay 14 has remained de-energized until this circuit for the solenoid 47 is made, the latch 45 will be released as described. Almost immediately the off normal contacts 49 and 50 are made so that a circuit is established from battery, the contact 50, the contact 49, the ER relay 85 to ground. This relay is now held energized in two circuits, one from battery through the armature and back contact of the DR relay 14, the armature and front contact of the ER relay 85, the winding thereon to ground, and the other from battery through the off normal contacts 50 and 49, the winding of the ER relay 85 to ground, so that this ER relay will remain energized at least until the brush 11 has completed a cycle to the point where it has been stopped by the clutch element 46. If during its cycle the start switch 13 has been released so that when the brush 11 again reaches its start contact 12 the DR relay 14 will be energized, and the ER relay 85 will be released from its locking circuit. If the start switch 13 has not yet been released then the ER relay 85 will remain locked up even though the brush 11 has completed a cycle of its segments and been latched into its normal position. It will also be noted that upon the first operation of the ER relay 85 the circuit for the solenoid 35 of the slow operating relay is opened so that the armature 36 thereof is released from frictional contact with the rotating core 34 and under the influence of the spiral spring 37 will return to its normal position, thus opening the circuit of the release solenoid 47. It will thus be seen that immediately after the contact 39 has come into engagement with the contact 40 the release solenoid 47 will be opened and the circuit completed by the slow operating relay 36 will be opened.

It will be understood that the arrangements at all the other stations included in the loop circuit are exactly the same. Therefore, when the start key 13 is operated all of the drive relays 14, 20, 25 and 30 will be simultaneously operated, the slow operating relays at each of these stations will begin to operate and they will simultaneously close their contacts so as to start simultaneously the brushes 11, 18, 23 and 28. Thus the distributors will operate simultaneously and each of the brushes will make contact with corresponding segments simultaneously. In the drawings, Figs. 2 to 5 inclusive, segments 20 and 21 are connected together and constitute stop circuit segments. Segments 22 and 1 are also connected together and in turn connect to the conductor 16 so that as the brushes 11, 18, 23 and 28 come into contact with their segments 22 a derived path release circuit will be established from the battery, the ring 18 of the distributor, the segment 22, the conductor 16 through similar circuits at the other stations each including a clear out relay such as the CO relay 86 at station number 1, the CO relay 87 at station number 2 and the CO relay 88 at the station number 3. These clear out relays have their armatures connected to ground to which the various function relays are locked. Assuming, by way of example, that the function relay 89 has been operated and locked in a circuit from battery, its armature and front contact, its winding, the back contact and armature of the CO relay 86 to ground, then it will be seen that by the operation of the CO relay 86 the function relay 89 may be released. Thus, as the distributors at the various stations are started the first action taken is to release any and all relays which have been locked into position by some previous operation of the receiving station.

Each station has thereat one or more function relays such as the function relay 89. This relay may be energized as at station 1 when the distributor 18 comes to its segments 2 and 3 providing the switch 90 at the transmitting or master station has been operated. Therefore, as all distributor brushes reach their number 2 segment a derived circuit will be established including the operated all call selecting push button 90, the FTR relay 91 at station number 1, the FTR relay 92 at station number 2, the FTR relay 93 at station number 3 and similar circuits at the other stations indicated by the box 32. Upon the operation of the FTR relay 91 a circuit is established from battery, the armature and front contact of the FTR relay 91, the winding of the FR relay 89, the back contact and armature of the CO relay 86 to ground. The FR relay responds and locks in a circuit from battery, its armature and front contact and its winding to ground over the circuit just traced. The FR relay will therefore remain locked until it is released by the transmission of another selecting signal. In this derived circuit, including the segments 2 and 3 of each of the distributors, all of the stations are called in. As another example, if the push button 94 has been operated then no one of the FTR relays 91, 92 or 93 would have been operated, but instead the FTR relay 95 at station number 1 would be operated when the brush 18 reached its segment 4. At station number 2 the segment number 4 is connected to the LTR relay 96 and at station number 5 the segment number 4 is connected to the LTR relay 97 so that at station number 1 a function relay will be operated whereas at all the other stations the LTR relays will be operated. At station number 1 then the FR relay 98 will respond while at station number 2 the LR relay 99 and at station number 3 the LR relay 100 will respond. These relays will lock in the manner described.

The function relays may be used for any desired purpose. As shown herein, merely by way of example, the function relay 98 will close a circuit for a bell 101 which may be traced from one side of the commercial source of alternating current through the bell 101, the front contact and armature of the FR relay 98, the back contact and armature of the LR relay 102 to the other side of the commercial source of supply. At the same time a connection will be made in parallel with the bell 101 for the green signal lamp 103 to indicate that at this station a selection has been made. At each of the other stations where the LR relays are operated a connection will be made through the red signal lamp 104 at station number 2 and 105 at station number 3 thence through the front contacts and armatures of the respective LR relays to the source of supply. Thus at one station the green lamp 103 will be active while at all the other stations the red lamp will be active.

If, on the other hand, the push button 106 had been operated then the FR relay 107 at station number 2 would have been operated when the various distributors reached the number 6 segments.

It should be noted that each of the function relays, such as the FR relay 89 at station number 1, the FR relay 107 at station number 2 and the FR relay 108 at station number 3 will control motors, such as the motor 109 at station number 1, the motor 110 at station number 2 and the motor 111 at the station number 3. These are indications that the motors of printing telegraph apparatus may be started so that as a result of this selection such printing telegraph apparatus may be enabled.

Throughout the drawings Figs. 2 to 5 inclusive, two segments have been connected together to form substantially a single segment for the purpose of making selections. This arrangement may be used in a system wherein there are only a small number of stations for the purpose of giving wide latitude in the operation of the devices. It should be distinctly understood, however, that this is not necessary and that each segment may be used for a separate derived circuit.

The switching arrangement shown in Fig. 2 may be such that the various push buttons are mechanically interlocked. By a conventional arrangement of this kind whenever any one of the push buttons, such as 90, is operated it will mechanically release any other button which has been operated previously. Each of the function buttons, such as the button 90 and those shown below, are arranged so that when pushed they will remain operated thereafter. Another button, shown at the top and numbered 112, is known as a selector release switch. This button when pushed will automatically release any other of the selecting buttons but will not itself remain operated. However, it will perform the same function as the selector start switch 13 thus opening the circuit and starting the devices as hereinbefore described.

Figure 9:
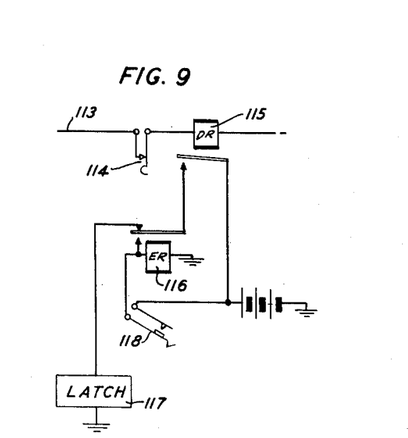
Fig. 9 is a skeleton schematic circuit diagram showing an alternative circuit arrangement which may be used at the various stations of the system, whereby the distributors may be started immediately without waiting a specified time.

Fig. 9 is a thumb nail sketch of an alternate circuit arrangement in which no time delay is employed. The system may be constructed with this circuit leaving out entirely the slow acting relay where the system will not be employed to transmit any other than the selecting signals. Thus, in Fig. 9 the fundamental circuit is shown as a conductor 113 passing through a start key 114 and a DR relay 115. As in the main circuit diagram the DR relay 115 is constantly operated until the circuit is opened by means of the start key 114. At this time a circuit will then be closed from battery, the armature and back contact of the DR relay 115, the armature and back contact of the ER relay 116 through the latch magnet or release solenoid 117 to ground. Under this condition the distributor will be started immediately, whereupon the off normal contacts 118 will close and cause the operation of the ER relay 116. This relay will then lock in a circuit from battery, the armature and back contact of the DR relay 115, the armature and front contact of the ER relay 116 and will remain in this condition until both the off normal contacts 118 are opened and the DR relay 115 is again operated.

What is claimed is:

1. The combination of a constant speed motor, a shaft rotated thereby, a magnetic relay core mounted coaxially thereon, an energizing winding for said core mounted in coaxial alignment therewith, a circular armature for said relay suspended loosely above said core with its center located on the axis of said shaft, a circuit closing contact carried by said armature, a fluid clutch mounted on said shaft, a rotary distributor mounted in axial alignment with said shaft including a distributor brush, a latch for restraining said distributor brush, a latch release magnet for moving said latch and a circuit including said circuit closing contact for energizing said latch releasing magnet.

2. A double clutching means for placing a rotary distributor arm in operation a predetermined interval after a start signal has been transmitted thereto, consisting of a constant speed motor, a contact operating device, a first clutch responsive to a start signal for imparting movement of said motor to said contact operating device, a rotary distributor arm, a second clutch for operatively associating said motor and said rotary distributor arm, a latch for normally restraining said distributor arm, a latch magnet for unlatching said distributor arm and a circuit arrangement including said latch magnet responsive to said contact operating device.

3. A double clutching means for placing a rotary distributor arm in operation a predetermined interval after a start signal has been transmitted thereto, consisting of a constant speed motor, a contact operating device, a first clutch responsive to a start signal for imparting movement of said motor to said contact operating device, a rotary distributor arm, a second clutch for imparting movement of said motor to said rotary distributor arm, said second clutch consisting of a slip friction device, a latch for normally restraining distributor arm, a latch magnet for unlatching said distributor arm and a circuit connection for energizing said latch magnet controlled by said contact operating device.

References Cited in the file of this patent

UNITED STATES PATENTS

| Number | Name | Date |
|---|---|---|
| 708,007 | Ball | Sept. 2, 1902 |
| 1,020,185 | Bullard | Mar. 12, 1912 |
| 1,338,122 | Carlstedt | Apr. 27, 1920 |
| 1,533,171 | Dowd | Apr. 14, 1925 |
| 1,868,910 | Miller | July 26, 1932 |
| 2,389,571 | Willis | Nov. 20, 1945 |

OTHER REFERENCES

"Chemistry of the Silicones", Rochow, 2nd ed., 1951, page 87. (Copy in Div. 31, QD 412–S6, R6.)